United States Patent [19]

Stubbing

[11] Patent Number: 5,228,211
[45] Date of Patent: Jul. 20, 1993

[54] METHOD AND APPARATUS FOR ENERGY EFFICIENT DRYING

[76] Inventor: Thomas J. Stubbing, Spout House, Bitterley, Great Britain

[21] Appl. No.: 474,124
[22] PCT Filed: Nov. 9, 1988
[86] PCT No.: PCT/GB88/00968
§ 371 Date: May 1, 1990
§ 102(e) Date: May 1, 1990
[87] PCT Pub. No.: WO89/04392
PCT Pub. Date: May 18, 1989

[30] Foreign Application Priority Data

Nov. 12, 1987 [GB] United Kingdom ............... 8726456
Dec. 8, 1987 [GB] United Kingdom ............... 8728603
Jun. 3, 1988 [GB] United Kingdom ............. 8813171-9

[51] Int. Cl.$^5$ .................................................. F26B 3/00
[52] U.S. Cl. .................................... 34/22; 34/219; 34/218
[58] Field of Search ............... 34/22, 27, 32, 37, 218, 34/219, 77, 236

[56] References Cited

U.S. PATENT DOCUMENTS

| | | | |
|---|---|---|---|
| 2,911,729 | 11/1959 | Wood | 34/37 |
| 3,242,584 | 3/1966 | Jacobs | 34/37 |
| 3,644,085 | 2/1972 | Beeley et al. | 34/236 |
| 3,766,662 | 10/1973 | Moyer | 34/155 |
| 3,921,308 | 11/1975 | Freze | 34/27 |
| 3,967,473 | 7/1976 | Arioli et al. | 34/155 |
| 4,447,965 | 5/1984 | Bray | 34/27 |
| 4,485,566 | 12/1984 | Vivares | 34/44 |
| 4,850,119 | 7/1989 | Führing | 34/27 |

FOREIGN PATENT DOCUMENTS

| | | |
|---|---|---|
| 0078894 | 5/1983 | European Pat. Off. |
| 0101074 | 2/1984 | European Pat. Off. |
| 2913427 | 10/1980 | Fed. Rep. of Germany |
| 3519568 | 10/1986 | Fed. Rep. of Germany |
| 272894 | 4/1951 | Switzerland |
| 617652 | 2/1949 | United Kingdom |
| 1558913 | 1/1980 | United Kingdom |

Primary Examiner—Henry A. Bennet
Assistant Examiner—Denise Gromada
Attorney, Agent, or Firm—Young & Thompson

[57] ABSTRACT

The invention provides a method and apparatus for energy efficient drying of moist material, for example washed garments, using superheated steam as the drying medium. Apparatus for carrying out the method comprises a casing 10 which is thermally insulated and gas-tight apart from an outlet vent 11. The air initially within the casing is circulated by a fan 13 through a heat source 16 and through moist garments 17. The heated air produces steam from the moisture in the garments which, due to the resultant increase in pressure in the casing, eventually displaces the air from the casing. Continued recirculation of the steam through the heat source 16 causes it to become superheated. As the process continues, and more moisture is evaporated from the garments, a portion of the superheated steam is continually discharged through the vent 11 where it passes into a condenser where its thermal energy is recovered and is transferred by heat exchange to, for example, water which may be used for other purposes.

31 Claims, 7 Drawing Sheets

METHOD AND APPARATUS FOR ENERGY EFFICIENT DRYING

FIELD OF THE INVENTION

The invention relates to a method and apparatus for energy efficient drying of moist material. The invention is particularly, but not exclusively, applicable to the drying of garments after washing in a laundry establishment. However, the expression "moist material" includes moist commodities of all kinds as well as individual items, such as garments.

BACKGROUND OF THE INVENTION

Most conventional drying methods and apparatus, such as laundry tumble dryers, employ air as the medium for transporting sensible heat energy from a heat source into the moisture in the material being dried in order first to heat and then to evaporate the moisture, and then to carry away the steam produced by that evaporation. Such methods and apparatus are inefficient in that typically up to around 75% of the sensible energy drawn from the heat source is wasted, mainly by emission of hot air to atmosphere, while the partly sensible but mainly latent energy in the steam produced by the evaporation of the moisture is not recovered as this too is emitted hot to atmosphere.

In such known drying methods and apparatus the kinetic energy required to provide the fan power to blow the air over the heat source and through the material being dried is finally dissipated and thus also wasted by emission to atmosphere as additional sensible energy within the steam and the air carrying it away. Thermal insulation of the apparatus is also generally inadequate for preventing significant loss of heat.

In known forms of apparatus heat exchange and air recirculation methods and apparatus are sometimes employed to reduce the wastage of sensible energy within the hot emission to atmosphere. For example, there may be provision for cross flow heat exchange between the hot air and steam emission and the cool ambient air being drawn towards the heat source to make use of part of the sensible energy which is otherwise wasted. Also, recirculation of a proportion of the hot air and steam emission back over the heat source may be employed to reduce the volume of cool ambient air required and thus reduce the amount of sensible energy to be transferred from the heat source.

Probably the best of the known recirculation methods typically reduces the total amount of sensible energy transferred from the heat source by around 40% by reducing the sensible energy wastage referred to earlier (typically up to about 75%) by around 50%. Other known recirculation or heat exchange methods tend to provide smaller wastage reductions.

Because the dew point temperature of the emission, even when the best of the known recirculation methods is employed, seldom exceeds 40° to 50° C., useful recovery of the latent energy from the steam contained within the emission, for example by condensation in a condenser to heat water, cannot viably be effected.

Another known form of drying apparatus sets out to achieve 100% air recirculation and thereby eliminate the need to emit air and steam through ducting. In such apparatus the steam contained within what would otherwise be the hot air and steam emission is condensed out of the recirculating air flow onto a coil cooled by a continuous flow of cold water passing through it. At the same time the heat from the circulating air is transferred to the water and both the resulting condensate and the then only slightly warmed water flow to drain, carrying with them virtually all of the thus wasted energy input. Such arrangement is commonly used in domestic tumble dryers. In commercial circumstances, however, where mains water is charged for by volume and not by a fixed annual Domestic Water Rate, or where means of cooling the water would need to be provided, such a method of avoiding the need for emission ducting and providing a flow of only slightly warmed water would not be viable.

SUMMARY OF THE INVENTION

The present invention sets out to eliminate most of the waste of sensible energy transferred from the heat source arising with known drying methods and apparatus as described above, and to allow, for example by heating water to around 90° C., recovery of most of the partly sensible but mainly latent energy in the steam produced by the evaporation of the moisture from the material being dried.

According to the invention there is provided a method of drying moist material in an enclosure, comprising the steps of introducing a batch of material to be dried into the enclosure, recirculating between a heat source and the batch of material a gas which initially fills the enclosure, whereby said gas becomes heated and produces steam from the moisture in the material, which steam increasingly displaces the initial gas from the enclosure and continues to be heated by recirculation past said heat source, thereby becoming superheated, continuing to recirculate the superheated steam until the material reaches a required dryness, while allowing a portion of the steam to be discharged from the enclosure and recovering at least part of the thermal energy of the discharged steam, and then removing the batch of dried material from the enclosure.

Preferably the enclosure is thermally insulated, and the heat source is located within said thermally insulated enclosure. The enclosure is also preferably substantially gas-tight, at least while the step of recirculating the superheated steam is being carried out, except for means allowing said discharge of a portion of the steam, and in this case also the heat source is preferably located within said enclosure.

The thermal energy may be recovered from said discharged steam by at least partly condensing the steam and using the latent and sensible heat therefrom to heat a further fluid by heat exchange therewith. The condensate produced by condensation of said discharged steam may also be recovered.

The method may include the step of ceasing recirculation of the steam before removing the batch of dried material from the enclosure.

The method may then also include the further step, after ceasing recirculation of the steam and before removing the batch of dried material from the enclosure, of cooling said dried material. The cooling of the dried material may be effected by passing a cooling gas, for example ambient air, over said material.

An alternative method according to the invention comprises the steps of passing successive batches of material to be dried continuously into the enclosure, through said drying location, and out of the enclosure, while maintaining the recirculation of superheated steam, the continuous passing of batches of material through the drying location beginning only after the circulation steam has become superheated while the first said batch of material is in the enclosure.

In any of the above methods the recirculation of the superheated steam in the enclosure is preferably carried out at substantially atmospheric pressure.

The heat source may comprise one or more gas burners, the gaseous combustion products from the burners being introduced into the enclosure, said gaseous combustion products diluting the portion of the steam discharged from the enclosure without significantly lowering the dew point temperature thereof.

The methods according to the invention may also include the step of introducing a further gas into the enclosure during drying, the amount of which further gas is controlled to be in proportion to the amount of steam discharged from the enclosure, said proportion being controlled to improve the condition of the dried material without significantly lowering the dew point temperature of the discharged steam.

Alternatively, the proportion of the further gas may be controlled to lower the dew point temperature of the discharged steam sufficiently to lower the temperature range in which drying takes place.

The invention also provides apparatus for drying moist material comprising a thermally insulated enclosure, a drying location within the enclosure, a heat source located within said thermally insulated enclosure, means for recirculating gas between said heat source and the drying location, said heat source being capable of supplying sufficient thermal energy to the recirculating gas to produce steam from moist material at the drying location and to superheat the steam, steam venting means leading from the enclosure, said enclosure being capable of being rendered substantially gas-tight, during said recirculation, apart from said steam venting means, and means for recovering at least part of the thermal energy of steam discharged from the enclosure through said venting means.

Said means for recirculating gas between the heat source and the drying location may comprise power-driven fan means, which is also preferably located within the enclosure.

Said heat source may comprise one or more gas burners, preferably natural gas burners.

Means may be provided for introducing a further gas into the enclosure during drying.

The drying location may be defined by a container within the enclosure, said container being formed with apertures through which the recirculating gas may pass. The walls of the container may include passages, means being provided for passing heated fluid medium through said passages, whereby to provide the heat source. For example, the walls of the container may be formed by spaced stretches of a tubular conduit for the heated fluid medium, the tubular conduit being spirally wound to provide at least the peripheral wall of a generally drum-shaped container, the convolutions of the spiral being spaced apart to provide said apertures in the container.

Means may be provided for passing a fluid heating medium or a fluid cooling medium selectively through said passages.

The container is preferably rotatable. Alternatively, however, the container may enclose a rotatable subsidiary container, in which the material to be dried may be placed, said subsidiary container also being formed with apertures through which the recirculating gas may pass.

The enclosure may include an openable access door, which is sealable in gas-tight manner, for providing access to the drying location.

Means may be provided for passing a cooling gas through the drying location, after drying of material at said location has been completed.

For continuous drying the enclosure may be provided with substantially gas-tight inlet and outlet means, a movable conveyor being provided to transport material to be dried into and out of the enclosure through said inlet and outlet means respectively, in substantially gas-tight manner. The inlet and outlet means may each comprise a pair of cooperating rollers having flexibly resilient engaging outer surfaces, adapted to embrace the conveyor, and material carried thereby, as it passes through the nip between the rollers.

In any of the forms of apparatus according to the invention a condenser may be provided for recovering, by heat exchange, at least part of the thermal energy of steam discharged from the enclosure through said venting means. Means are then also preferably provided for recovering the condensate from the condenser.

BRIEF DESCRIPTION OF THE DRAWINGS

The following is a more detailed description of embodiments of the invention, by way of example, reference being made to the accompanying drawings in which.

DESCRIPTION OF THE PREFERRED EMBODIMENTS

Figure 1:
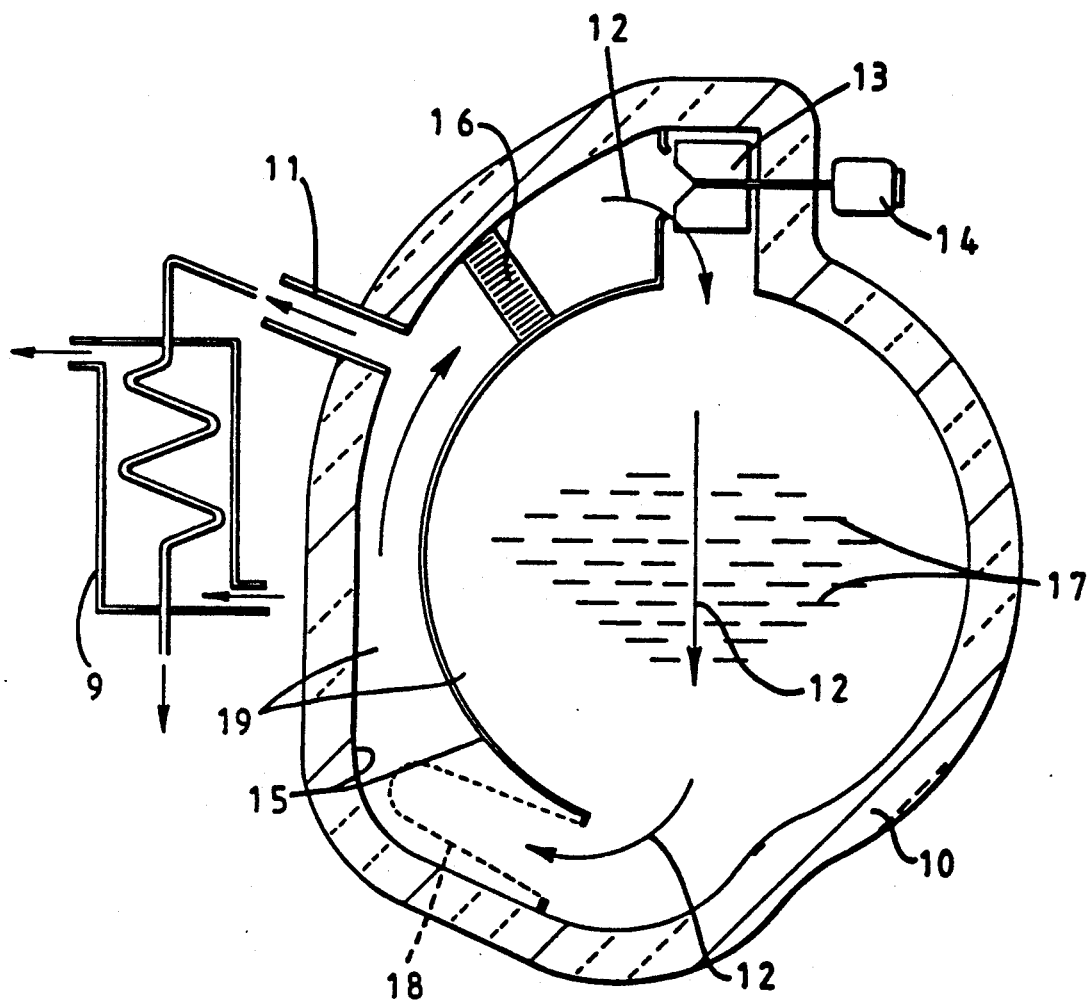
FIG. 1 is a diagrammatic section through one form of drying apparatus according to the invention.

Referring to FIG. 1, there is shown diagrammatically a sectional representation of one form of apparatus in accordance with the invention for energy efficient drying of moist material. The apparatus comprises an outer casing 10 which is thermally insulated, and gas-tight apart from the provision of an outlet vent 11. Within the casing 10 continuous recirculation of a gas, the circulation being indicated by arrows 12, is effected by means of a fan 13 powered by a motor 14 via ducting 15, through a heat source 16 by means of which the gas is heated by transfer to it of sensible energy from the heat source 16, through moist items 17 to which the gas loses heat, through an optional filter 18, and then back again through the heat source 16. In the course of recirculation of the gas, sensible energy is continuously transferred from the heat source 16 to the moisture in the items 17 being dried. The gas, which initially normally consists of air occupying the spaces 19 within the casing 10, is increasingly displaced by the steam produced by the resulting evaporation of the moisture from the items 17 as the temperature rises. When the minimum temperature of the mixture of air and steam reaches the boiling temperature of the moisture, all of the sensible energy being transferred to the circulating gas from the heat source 16 can then be taken up by the steam in the gas in the form of superheating of the steam.

Initially the displaced air is vented through the outlet vent 11, and then the gas including a rapidly increasing proportion of the steam being produced is vented, and then for the remainder of the batch or continuous process time virtually pure steam is vented through the outlet vent 11. A condenser 9 is connected to the vent 11 so that most of the sensible and latent energy contained in the steam produced by the evaporation of the moisture from the items 17 is then recovered together with the resulting condensate. The heat recovered by the condenser may be used to heat water, for example for the washing of items.

Figure 2:
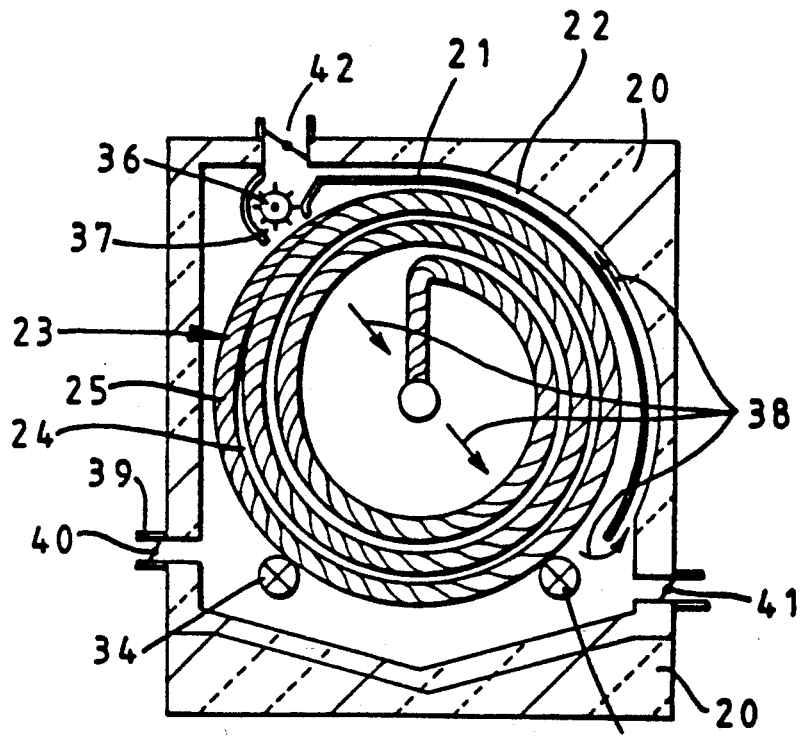
FIG. 2 is a similar view through an alternative form of drying apparatus.
Figure 3:
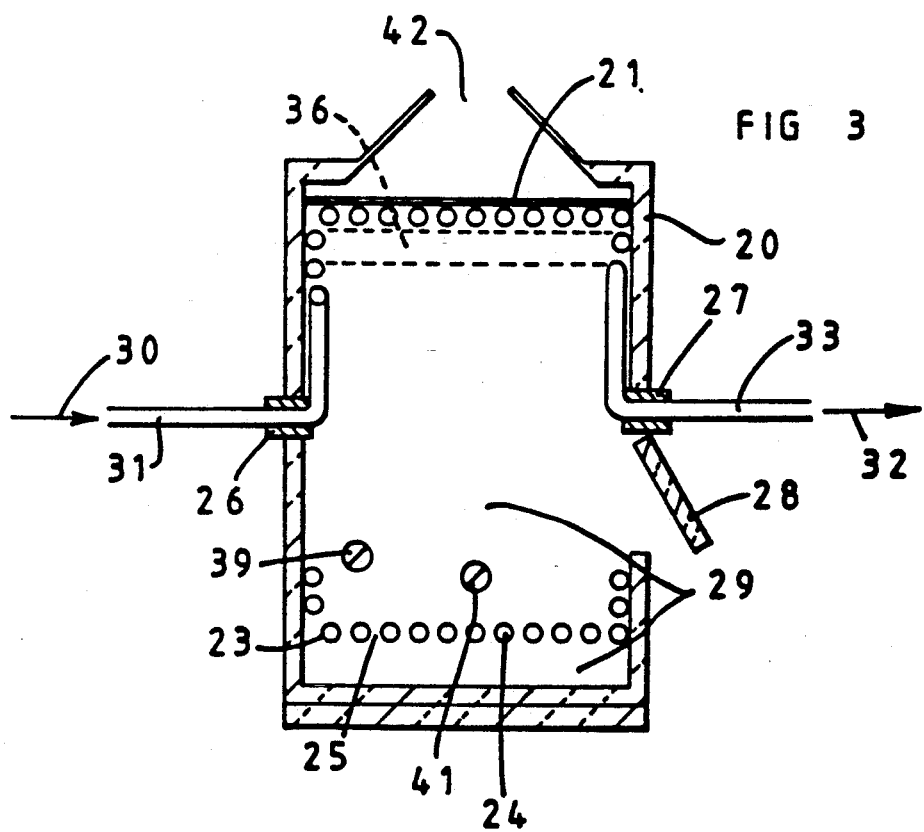
FIG. 3 is a diagrammatic longitudinal section through the apparatus of FIG. 2.

Referring to FIGS. 2 and 3, there is shown diagrammatically front and longitudinal sectional views of an alternative form of apparatus for batch drying of moist linen. The apparatus comprises a thermally insulated and gas-tight outer casing 20 the inner surface of which is preferably of bright, and thus heat reflecting, stainless steel. Within the casing there is provided an inner generally part-cylindrical shell 21, also preferably of bright stainless steel sheet, which provides between itself and the inner surface of the outer casing 20 a duct 22 extending along the length of the outer casing. The duct 22 spans the length of a heat source which is in the form of a rotatable drum 23 made of spiral Wound continuous steel tube 24, preferably having a smooth matt black and thus heat radiating surface, with approximately half-tube diameter wide spiral gaps 25 between the convolutions. The gaps 25 are interrupted at appropriate intervals by narrow matt black smooth stainless steel cross pieces (not shown) to prevent items escaping from within the drum 23 through the gaps.

The ends of the steel tube 24 forming the drum 23 extend axially at each end of the drum respectively, and pass through rotating unions 26 and 27 which act as bearings. A thermally insulated linen insertion and removal door 28, which is gas-tight when closed, is also provided in the outer casing 20.

In an alternative arrangement (not shown) both ends of the steel tube 24 may be arranged to emerge through a common rotating union acting also as a bearing located in place of the first rotating union 26, thus eliminating the need for the second rotating union 27. This may improve access to the drum through the door 28. In this alternative arrangement the end of the steel tube 24 which, in the FIG. 2 and 3 arrangement, emerges through the second rotating union 27, is led back to the common rotating union through one of four ribs (not shown) fixed within and along the length of the drum 23 approximately at right angles to the convolutions of the steel tube 24.

The space 29 within the outer casing 20 is heated by steam, as indicated at 30, being made to flow into the spiral wound steel tube 24 through a first flexible connection 31, and the resulting condensate, indicated at 32, flows out through a second flexible connection 33. Rotation of the drum 23 is preferably arranged to be in the direction opposite to that of the winding of the steel tube 24 to ensure that the condensate flows out through the second flexible connection 33.

The drum 23 rests on rollers 34 and 35 and is rotated by an electric motor (not shown) which may either be arranged to drive the drum directly or may be arranged to drive one or both of the rollers 34, 35.

A fan 36 is located in a plenum 37 which spans the drum 23 and is in communication with the duct 22. The fan causes a circulation of the gas within the outer casing, as indicated by arrows 38, inwardly through the spiral gaps 25 between the convolutions of the tube 24 and diagonally downwards through the width of the drum before returning to the fan 36 via the semi-cylindrical duct 22. The circulation of the gas within the casing, in conjunction with rotation of the drum, causes sufficient turbulence to ensure that the linen being tumbled within the drum, with the aid of ribs (not shown) fixed within and along the length of the drum across and approximately at right angles to the steel tube 24 spiral windings, can be quickly dried both by contact of the various surfaces of the linen with the inwardly facing surfaces of the steam heated tube 24 and by the resulting movement of hot gas through the linen weave.

Communicating with the interior of the casing 20 are an outlet duct 39, controlled by a spring-loaded valve 40, and a valve-controlled inlet duct 41. A further valve-controlled exhaust duct 42 communicates with the plenum 37.

The operation of the apparatus is as follows: When the space within the drum 23 has been loaded with moist linen through the door 28 and both the flow of steam 30 into the spiral wound steel tube 24 and rotation of the drum 23 have commenced, the air initially occupying the space 29 within the thermally insulated and gas-tight casing 20 is heated by release of latent energy from the steam 30 within the spiral wound steel tube 24, and transfer of that energy as sensible energy outwards through the walls of the spiral wound steel tube 24 into the air which is being circulated by the fan 36. As the air is heated it begins to expand and, on attainment, within the outer casing 20, of the slight pressure necessary to open the spring-loaded gas outlet valve 40 in the outlet duct 39, the valve 40 opens and the air begins to exhaust through the duct 39.

A steam is produced by evaporation of moisture from the linen, the proportion of steam in the air entrapped within the outer casing 20 rises rapidly, due to continued release of latent energy from the steam 30 within the spiral wound steel tube 24, and the remaining air is quickly displaced from within the casing 20 through the outlet duct 39, to be followed by a continuous flow of steam.

By way of example, the air contained within a typical 1.5 cubic metres of space within the outer casing of a 40 kg dry weight capacity tumble dryer will be displaced during approximately the first 4% of the time taken by a drying cycle, by the steam produced by the evaporation of the typically around 20 kg weight of residual moisture content in the 40 kg dry weight of linen. The evaporation of the 20 kg of residual moisture will produce around 34 cubic metres of steam at 100 kPa pressure, and dividing the 34 $m^3$ of steam produced by the around 1.5 $m^3$ of vacant space gives around 23 x the volume of the space available within the outer casing.

A flow meter and/or temperature gauge (not shown) is provided with its sensor placed in the outlet duct 39, and monitors the rate and/or temperature at which steam is emitted through the outlet duct. As soon as the emission flow rate falls to virtually nil and/or the temperature begins to rise towards that of the steam 30 entering the spiral wound tube 24 (both factors indicating that drying of the linen is complete) the steam supply through the flexible connection 31 is turned off by an automatic valve (not shown) controlled by the aforementioned flow meter and/or temperature gauge.

At the same time as that automatic valve is turned off the exhaust outlet 42 set in the top of the outer casing 20 is opened by means of appropriate valves (not shown) and the plenum 37 is closed so that the fan 36 diverts through the exhaust outlet 42 the remainder of the steam produced by evaporation of moisture from the linen. Due to the resulting drop in pressure within the space 29 within the outer casing 20, the spring-loaded outlet valve 40 closes automatically and the spring-loaded inwardly opening valve 41 located near the base of the outer casing 20 then opens to allow a flow of ambient air into and through the space 29 within the outer casing. Since this ambient air is heavier than the steam remaining within the outer casing 20, steam will at first be emitted through the exhaust outlet 42 and both the latent and sensible energy in this steam, and that emitted through the spring-loaded outlet valve 40, is recovered by passing it into a condenser (not shown) and is used to heat laundry washing water or for other purposes. The condensate which is then emitted from the condenser is effectively distilled water and is either used as such or is added back to the supply of softened laundry water.

As soon as the temperature of the emission through the exhaust outlet 42, which is monitored by a thermostat (not shown), begins to fall, indicating that the remaining steam has been exhausted, a diversion valve (not shown), activated by the thermostat and located in a duct leading away from the exhaust outlet 42, is closed to divert the air then being exhausted to atmosphere.

Acceleration of the cooling of the still rotating drum 23 and of the linen still being tumbled can be effected by an arrangement (not shown) for passing cold water instead of steam through the tube 24. The hot water then produced by heat transfer from the still rotating drum 23 and, to a lesser extent from the linen, into that water, which will then emerge through the second flexible connection 33, can then also be used to wash further linen. As soon as the drum 23 and the linen have been sufficiently cooled as required for removal of the linen, as indicated by a thermostat located within the exhaust outlet 42, the electric motors provided to rotate the drum 23 and the fan 36 are stopped automatically and an audible and/or visual signal is given to indicate that the dry linen can be removed from the drum and a further load of moist linen introduced.

As an alternative arrangement to the steam heating described above, a heating medium other than steam may be employed, for example hot oil or hot combustion gas may be made to flow into the spiral wound steel tube 24 through the first flexible connection 31 and out through the second flexible connection 33.

In another alternative arrangement according to the present invention, heat may be provided by means of a fixed heating medium, for example one or more electrically heated elements located within the spiral wound steel tube 24 comprising the drum 23. In a further alternative arrangement according to the invention, the spiral wound steel tube 24 comprising the rotatable drum 23 may be replaced by a non-spiral wound arrangement of the steel tube or by an alternative form of drum-shaped rotatable jacket heated by steam or one of the alternative heating media referred to earlier.

In any of the described arrangements the spiral wound tube 24, or its replacement as described in the preceding alternative, may be of a material other than steel.

Figure 4:
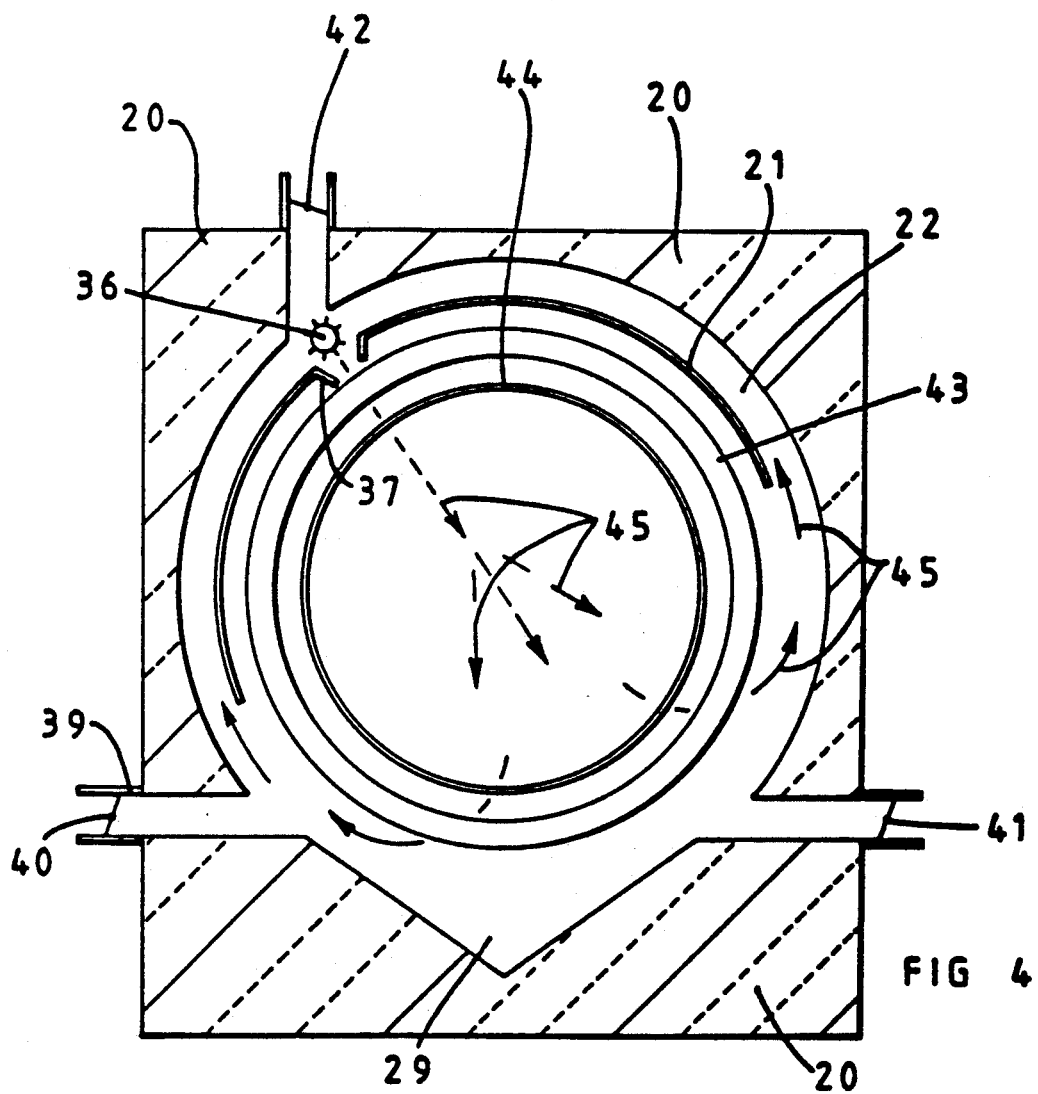
FIG. 4 is a diagrammatic section through a further form of drying apparatus.

Referring to FIG. 4, there is shown diagrammatically a front sectional view of an alternative form of apparatus for batch or continuous drying of linen according to the invention. In this arrangement the drum 43 is non-rotatable and lacks the previously described ribs and rotating unions. The drum 43 is otherwise of a spirally-wound tube construction similar to that of the drum 23 of the previously described arrangement. Within the fixed drum 43 is a similarly shaped rotatable drum 44 which is not directly heated. The inner drum 44 is constructed of perforated sheet steel an has fixed ribs (not shown) within and along its length. Both the inner and outer surfaces of the drum 44 are preferably matt black. Other components of the apparatus which correspond to the components of the apparatus of FIGS. 2 and 3 are given the same reference numerals.

In this alternative arrangement the flow of air and/or steam, indicated at 45, is induced by the fan 36 and passes through the non-rotatable heat source drum 43, as in the previously described arrangement, and also through the perforations in the rotatable inner drum 44. Because the inner drum 44 is heated by emission of both radiated and convected energy from the heat source drum 44, the inner drum 44 in turn emits radiated, conducted and convected energy from its inner surface into the moist linen being tumbled by rotation of the inner drum 44.

In this and any previously described arrangement according to the invention the heat source may, as appropriate, be located away from direct contact with the more steam, high pressure hot water, or hot oil heated heater batteries through which the gas in the insulated and gas-tight outer casing is circulated. The transfer of sensible energy from the heat source to the moisture in the linen items or other items or commodity being dried is then mainly in the form of the superheat energy of the steam of which the circulating gas is mainly comprised.

In a further alternative arrangement, not shown, according to the invention, the heat source may be one or more natural gas burners located away from direct contact with the linen and firing directly into a duct or plenum through which the gas contained within the insulated and gas-tight outer casing is circulated.

When this alternative direct natural gas burning apparatus is employed, the gases comprising the products of combustion, assuming a typical 2% oxygen surplus in them when emitted from the burner or burners, will as the drying process gets under way dilute the gas circulating within the gas-tight outer casing. For example, during a typical linen batch drying cycle to remove around 20 kg of moisture from around 40 kg of linen, the approximate cubic metre volumes of each of the main components of the displaced gas vented into a condenser as earlier described will alter as indicated below:

| Component: | Displaced with use of indirect heating: | Products of combustion: | Displaced with use of direct gas heating: |
| --- | --- | --- | --- |
| Steam | 36 | 6 | 42 |
| Nitrogen | 2 | 26 | 28 |
| Carbon dioxide | — | 3 | 3 |
| Oxygen | 0.5 | 0.7 | 1.2 |
|  | 38.5 | 35.7 | 74.2 |

The dew point temperature of the displaced gas containing the products of combustion averages just under 90° C., so that when vented and passed through the condenser heating will still be at a useful temperature with the added advantage that the combustion of the natural gas increases the steam volume emitted, so that condensation of the increased volume of steam produces for example an increased volume of hot water and effectively results in the natural gas being burnt at 100% efficiency.

FIGS. 5, 6, 7 and 8 show diagrammatically an apparatus in accordance with the invention for continuous as opposed to batch drying of moist items or a moist commodity, for example moist garments. The arrangement provides for continuous passage of moist garments into and out of a thermally insulated and substantially gas-tight enclosure.

Figure 5:
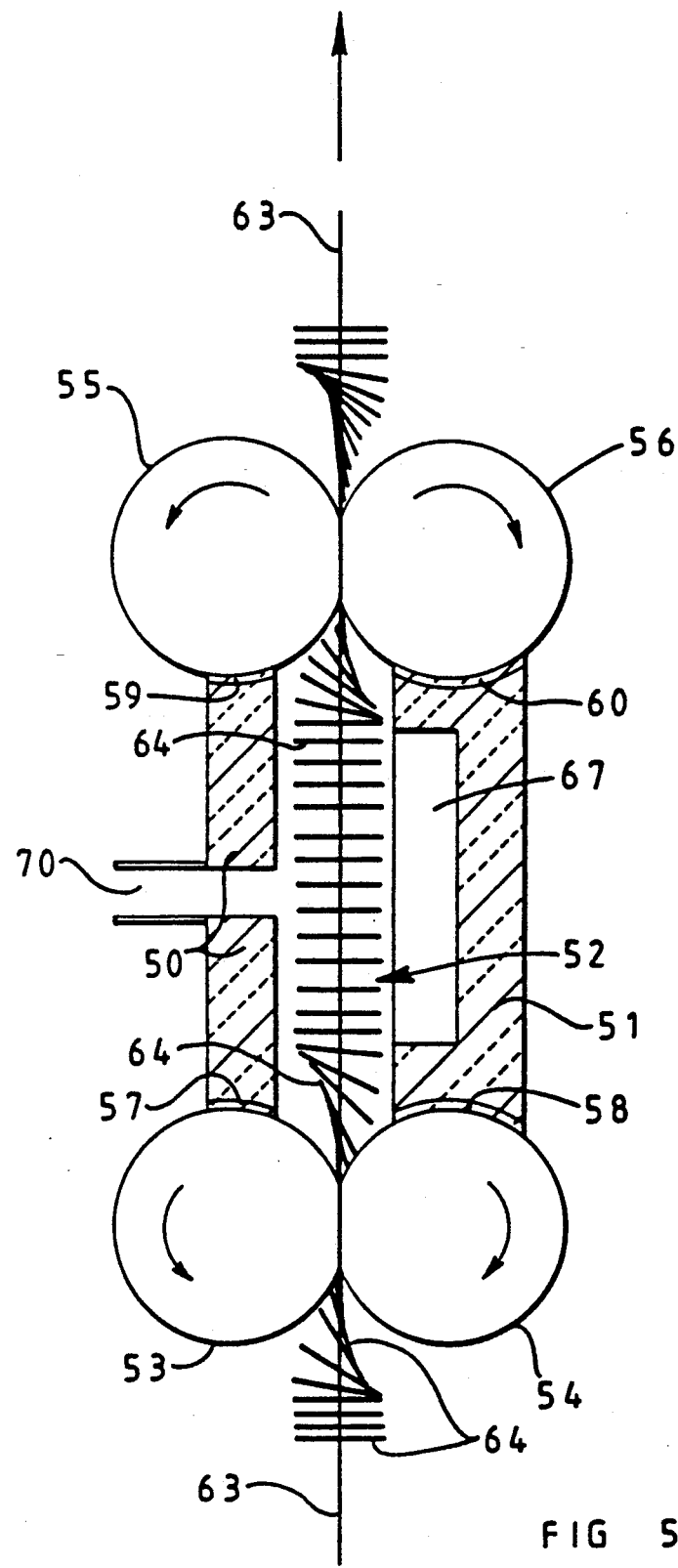
FIG. 5 is a diagrammatic horizontal section through a form of drying apparatus suitable for the continuous drying of garments.

Referring to FIG. 5, the enclosure is defined by two generally parallel thermally insulated wall structures 50, 51 which are spaced apart to define a space 52 between them. The space 52 is closed at one end by parallel vertical contra-rotating inlet rollers 53, 54 and at the opposite end by similar outlet rollers 55 and 56.

The outer surface of each roller is composed of suitable thermally insulative closed cell soft sponge rubber or plastics material. The rollers in each pair are parallel and are pressed together with their engaging faces slightly flattened against each other. The rollers are also in sealing engagement with concave end faces 57, 58, 59 and 60 respectively on the wall structures 50 and 51. The space 52 is further enclosed by an upper horizontal wall member 61 and a lower horizontal wall member 62 (see FIG. 6), the wall members being in gas-tight sealing engagement with the upper and lower ends of the rollers so that the space 52 is substantially gas-tight.

Figure 6:
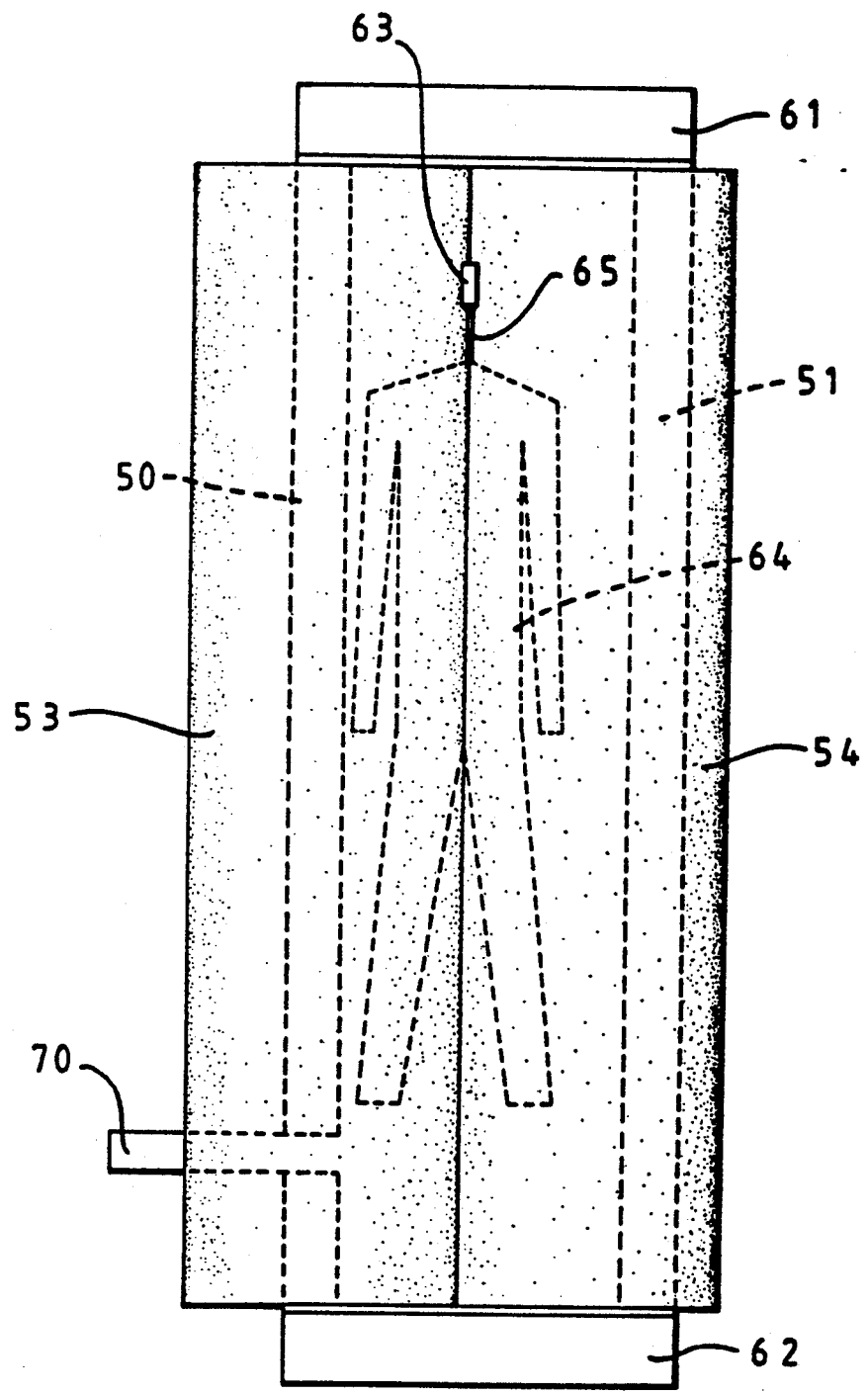
FIG. 6 is an end view of the apparatus of FIG. 5.
Figure 7:
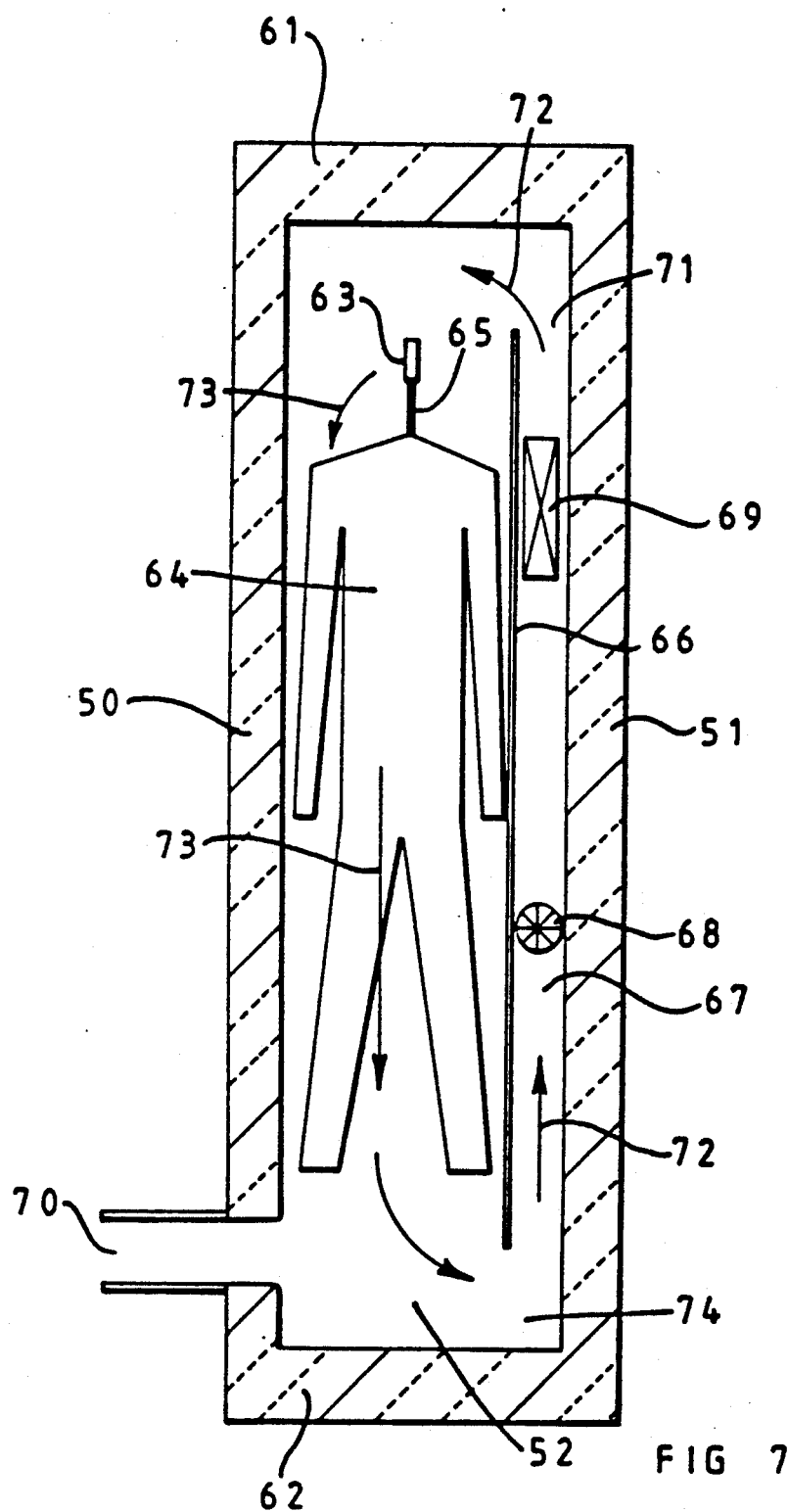
FIG. 7 is a vertical transverse section through the apparatus of FIGS. 5 and 6.
Figure 8:
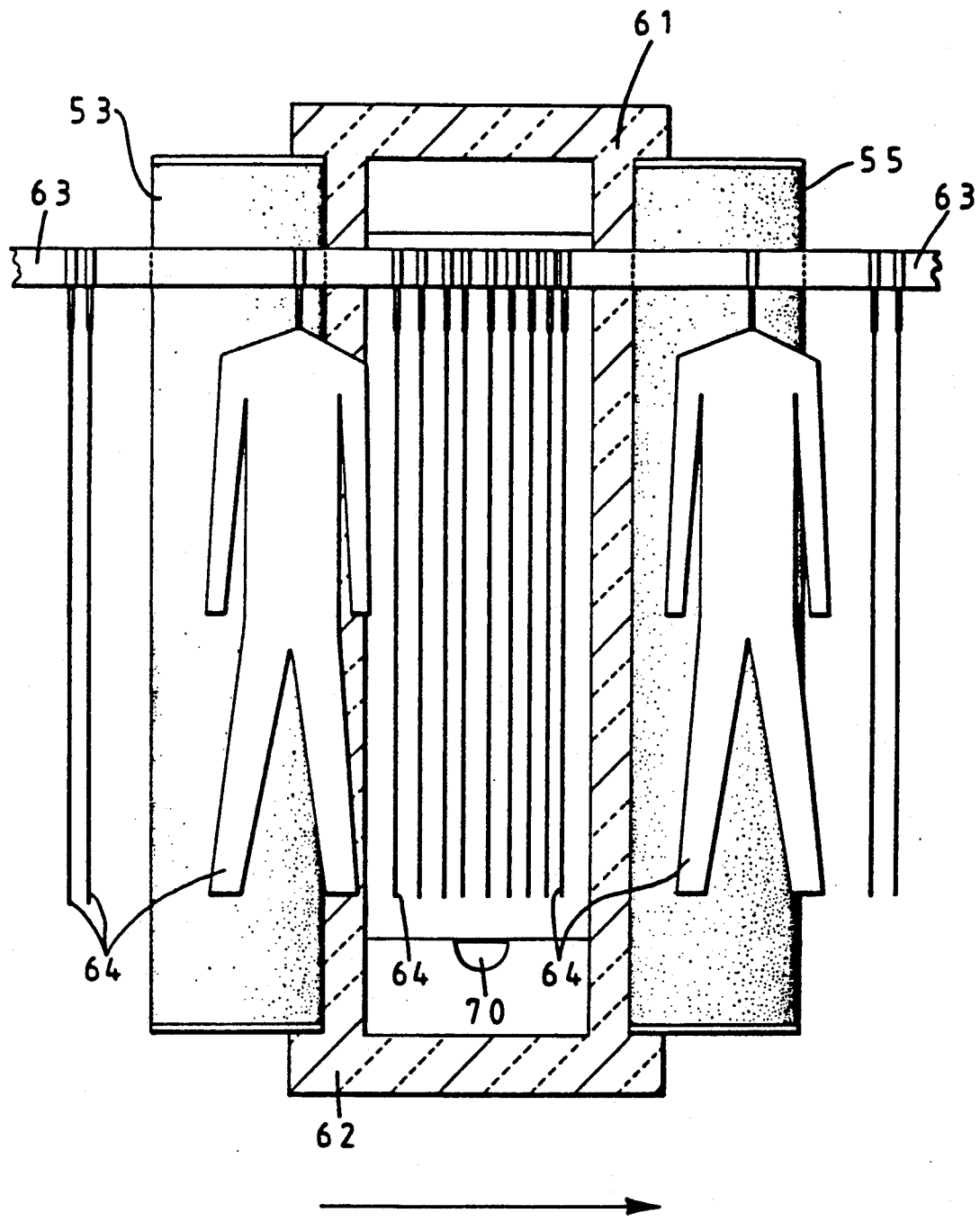
FIG. 8 is a longitudinal vertical section through the apparatus of FIGS. 5-7.

Extending through the space 52 is a stretch of a continuous movable conveyor 63 from which moist garments 64 are suspended on hangers 65 (see FIGS. 6 and 7).

The conveyor 63 and rollers 53-56 are driven so that, when the apparatus is in operation, the garments 64 hanging from the conveyor 63 pass into the enclosed space; 52 through the nip between the inlet rollers 53 and 54, pass along the enclosed space 52 and then exit from that space through the nip between the outlet rollers 55 and 56. As best seen in FIG. 5, the garments are caused to turn parallel to the conveyor 63 as they pass through the nips between the rollers, but extend transversely of the conveyor 63 when passing along the space 52. As best seen in FIG. 6, the outer surfaces of the rollers are sufficiently soft and resilient as to be pressed around the conveyor 63 and garments 64 in gas-tight manner so that the enclosed spaced 52 remains substantially sealed and gas-tight.

Referring in particular to FIG. 7, the wall structure 51 of the enclosure is formed with a vertical baffle 66 which provides a chamber 67 which extends along substantially the whole length of the space 52 but is open at its upper and lower ends. Disposed in the space 67 is a motor-driven fan 68 and a heat source 69. A vent 70 leads outwardly from the lower part of the space 52 through the wall structure 50.

In operation, the gas within the enclosed space 52 is impelled upwardly through the space 67 by the fan 68 and over the heat source 69, before emerging through the aperture 71 at the upper end of the baffle 66, as downwardly around and between the garments 64 as indicated by the arrows 73 and then re-enters the space 67 through the lower aperture 74.

As in the previously described arrangements, circulated over the heat source 69 and becomes heated it warms and vaporises the moisture in the garments. As the moisture is vaporised and expands, the air initially in the enclosed space 52 is discharged through the vent 70 with an increasing proportion of steam. As the circulating gaseous mixture continues to be heated it eventually consists substantially entirely of superheated steam. The superheated steam passes around and between the garments 64 passing successively through the enclosed space 52, drying the garments, the excess superheated steam being discharged through the vent 70 where it is condensed by a condenser (not shown) to effect heat recovery, as in the previously described arrangements.

The circulation of the superheated steam within the space 52 takes place at around atmospheric pressure so that there is not a significant pressure difference between the space 52 and the ambient atmosphere outside the apparatus. The engagement between the rollers 53, 54 and 55, 56, and between the rollers and the wall structures, does not therefore have to resist a substantial pressure difference.

In any of the arrangements according to the invention described above, one or more filters may be provided for the removal of lint and/or other debris from the recirculating and/or vented gas flows.

Because the dew point temperature of steam at atmospheric pressure is 100° C., the minimum drying temperature when using the method according to the invention is also 100° C. if the pressure within the thermally insulated and gas-tight enclosure is also atmospheric. The maximum drying temperature can controlled thermostatically as desired at above 100° C.

By providing an extraction fan at the outlet vent of any apparatus according to the present invention, a controlled reduction in the pressure within the enclosure can be induced. For example the pressure may be reduced to 50 kPa at which partial vacuum the dew point temperature of steam is reduced to 81.35° C. The minimum drying temperature can thus be brought below 100° C so that by thermostatically controlling the maximum drying temperature to, for example 95° C., items or commodities which are sensitive to temperatures above 95° C. can also be dried. Downstream of the extraction fan most of the sensible and latent energy contained in the steam produced by the evaporation of the moisture from the items or commodity being dried is then recovered, together with the resulting condensate, as previously described.

Providing an extraction fan at the outlet vent of any apparatus according to the present invention, in particular for continuous drying, can allow equalisation of the pressures inside and outside the enclosure, so that efficiency reducing ingress of air into the enclosure, or wasteful egress of steam from the enclosure, is prevented, in particular through the locations where the moist items pass into and out of the enclosure.

Enhancement of the performance of apparatus according to the invention, combined with rationalisation of the manufacture of, in particular, the outer shell or casing, may be achieved by replacing conventional sheet metal construction of the main fixed components by casting the thermally insulated and gas-tight outer shell or casing in one piece with appropriate lugs, bearings, etc., embedded in the casting. There may be employed for that purpose a known two-component modified isocyanurate system producing a rigid non-porous foam resistant to water and water vapour penetration and to drying temperatures of up to 180° C. and possessing high compressive tensile and shear strength combined with a low K value of around 0.02 W/mK.

In all of the described embodiments of the apparatus according to the present invention described above, the energy required to drive the fan is not, as in known drying methods, finally dissipated and thus wasted by emission to atmosphere as sensible energy, but is retained within the thermally insulated and gas-tight outer shell or casing. That energy therefore contributes to the heating and evaporation of the moisture from the material being dried, and thus serves to reduce the amount of sensible energy required to be drawn from the heat source.

In any of the arrangements described above, a further gas, for example air, may be injected into the drying enclosure while drying is taking place. The injection of the further gas may be controlled in proportion to the amount of steam being discharged from the enclosure, either in order to improve the condition of the dried material without significantly lowering the dew point temperature of the steam, containing the injected further gas, being discharged, or in order to lower the dew point temperature of the discharged steam so as to reduce the drying temperature range, thus enabling materials sensitive to higher temperatures to be dried while not significantly lowering the dew point.

While linen or garments have been cited by way of example within the preceding detailed descriptions, the use of the invention is not confined to the energy efficient drying of linen, and the methods and apparatus according to the invention can be used for the energy efficient drying of any other moist items or commodities having sufficient particle size and temperature tolerance.

I claim:

1. A method of drying moist material in a drying location within an enclosure, comprising the steps of introducing a batch of material to be dried into the enclosure, recirculating between a heat source located within the enclosure and the batch of material a gas which initially fills the enclosure, whereby said gas becomes heated and produces steam from the moisture in the material, the heating of said moisture in the material constituting substantially the sole source of steam in the enclosure during recirculation, which steam increasingly displaces the initial gas from the enclosure while continuing to be heated by recirculation past said heat source, thereby becoming superheated, until substantially superheated steam alone is being recirculated, continuing to recirculate the superheated steam until the material reaches a required dryness, while allowing a portion of the steam to be discharged from the enclosure through a vent and recovering at least part of the thermal energy of the discharge steam outside of the enclosure, and then removing the batch of dried material from the enclosure, said enclosure being thermally insulated and substantially gas-tight, at least while the step of recirculating the superheated steam is being carried out, except for said vent allowing said discharge of a portion of the steam.

2. A method according to claim 1, wherein thermal energy is recovered from said discharged steam by at least partly condensing the steam and using the latent and sensible heat therefrom to heat a further fluid by heat exchange therewith.

3. A method according to claim 2, wherein the condensate produced by condensation of said discharged steam is also recovered.

4. A method according to claim 1, including the step of ceasing recirculation of the steam before removing the batch of dried material from the enclosure.

5. A method according to claim 4, including the further step, after ceasing recirculation of the steam and before removing the batch of dried material from the enclosure, of cooling said dried material.

6. A method according to claim 5, wherein said cooling of the dried material is effected by passing a cooling gas over said material.

7. A method according to claim 6, wherein the cooling gas is ambient air caused to flow through the enclosure.

8. A method according to, claim 1, comprising the steps of passing successive batches of material to be dried continuously into the enclosure, through said drying location, and out of the enclosure, while maintaining the recirculation of superheated steam, the continuous passing of batches of material through the drying location beginning only after the circulation steam has become superheated while the first said batch of material is in the enclosure.

9. A method according to claim 1, wherein the recirculation of the superheated steam in the enclosure is carried out at substantially atmospheric pressure.

10. A method according to claim 1, wherein the heat source comprises one or more gas burners and the gaseous combustion products from the burners are introduced into the enclosure, said gaseous combustion products diluting the portion of the steam discharged from the enclosure without significantly lowering the dew point temperature thereof.

11. A method according to claim 1, including the step of introducing a further gas into the enclosure during drying, the amount of which further gas is controlled to be in proportion to the amount of steam discharged from the enclosure, said proportion being controlled to improve the condition of the dried material without significantly lowering the dew point temperature of the discharged steam.

12. A method according to claim 1, including the step of introducing a further gas into the enclosure during drying, the amount of which further gas is controlled to be in proportion to the amount of steam discharged from the enclosure, said proportion being controlled to lower the dew point temperature of the discharged steam sufficiently to lower the temperature range in which drying takes place.

13. Apparatus for drying moist material comprising an enclosure, a drying location within the enclosure, a heat source located within the enclosure means for recirculating gas initially in said enclosure between said heat source and the drying location, said heat source being capable of supplying sufficient thermal energy to the recirculating gas to produce steam from moist material at the drying location and to superheat the steam, characterised in that there are provided steam venting means leading from the enclosure, in that said enclosure is thermally insulated and is capable of being rendered substantially gas-tight, during said recirculation, apart from said steam venting means, and in that means are provided for recovering at least part of the thermal energy of steam discharged from the enclosure through said venting means.

14. Apparatus according to claim 13, wherein said means for recirculating gas between the heat source and the drying location comprise power-driven fan means.

15. Apparatus according to claim 14, wherein the power-driven fan means are located within the enclosure.

16. Apparatus according to claim 13, wherein said heat source comprises one or more gas burners.

17. Apparatus according to claim 16, wherein the gas burners are natural gas burners.

18. Apparatus according to claim 13, including means for introducing a further gas into the enclosure during drying.

19. Apparatus according to claim 13, wherein the drying location is defined by a container within the enclosure, said container being formed with apertures through which the recirculating gas may pass.

20. Apparatus according to claim 19, wherein the walls of the container include passages, and means are provided for passing heated fluid medium through said passages, whereby to provide the heat source.

21. Apparatus according to claim 20, wherein the walls of the container are formed by spaced stretches of a tubular conduit for the heated fluid medium.

22. Apparatus according to claim 21, wherein the tubular conduit is spirally wound to provide at least the peripheral wall of a generally drum-shaped container, the convolutions of the spiral being spaced apart to provide said apertures in the container.

23. Apparatus according to claim 20, including means for passing a fluid heating medium or a fluid cooling medium selectively through said passages.

24. Apparatus according to claim 19, wherein said container is rotatable.

25. Apparatus according to claim 19, wherein said container encloses a rotatable subsidiary container, in which the material to be dried may be placed, said subsidiary container also being formed with apertures through which the recirculating gas may pass.

26. Apparatus according to claim 13, wherein the enclosure includes an openable access door, which is sealable in gas-tight manner, for providing access to the drying location.

27. Apparatus according to claim 13, wherein means are provided for passing a cooling gas through the drying location, after drying of material at said location has been completed.

28. Apparatus according to claim 13, wherein the enclosure is provided with substantially gastight inlet and outlet means, and a movable conveyor is provided to transport batches of material to be dried into and out of the enclosure through said inlet and outlet means respectively, in substantially gas-tight manner.

29. Apparatus according to claim 28, wherein the inlet and outlet means each comprise a pair of cooperating rollers having flexibly resilient engaging outer surfaces, adapted to embrace the conveyor, and material carried thereby, as it passes through the nip between the rollers.

30. Apparatus according to claim 13, wherein a condenser is provided for recovering at least part of the thermal energy of steam discharged from the enclosure through said venting means.

31. Apparatus according to claim 30, wherein means are provided for recovering condensate from the condenser.

* * * * *